United States Patent [19]
Bowen

[11] 3,776,039
[45] Dec. 4, 1973

[54] APPARATUS AND METHOD FOR DETERMINING THE TEMPERATURE OF A FLOWING GAS

[75] Inventor: Mack D. Bowen, Smyrna, Ga.

[73] Assignee: Tech-Air Corporation, Albany, Ga.

[22] Filed: Nov. 30, 1970

[21] Appl. No.: 93,719

[52] U.S. Cl. .................................. 73/341, 73/349
[51] Int. Cl. ...... G01k 13/02, G01k 1/16, G01k 7/14
[58] Field of Search .................... 73/341, 359, 349

[56] References Cited
UNITED STATES PATENTS

| | | | |
|---|---|---|---|
| 3,139,752 | 7/1964 | Giedt | 73/341 X |
| 3,204,447 | 9/1965 | Krause et al. | 73/341 X |
| 3,417,617 | 12/1968 | Rall | 73/341 |
| 3,232,113 | 2/1966 | Malone | 73/355 R |

Primary Examiner—Richard C. Queisser
Assistant Examiner—Frederick Shoon
Attorney—Sherman and Shalloway

[57] ABSTRACT

Apparatus for determining the temperature of a flowing gas including a first thermocouple disposed on the surface of a probe at the stagnation point, a second thermocouple disposed on the surface of the probe at a position spaced from the stagnation point, and equipment for calculating the actual temperature of the flowing gas from the temperatures sensed by the thermocouples independent of convective heat transfer and emmissivity of the probe.

7 Claims, 5 Drawing Figures

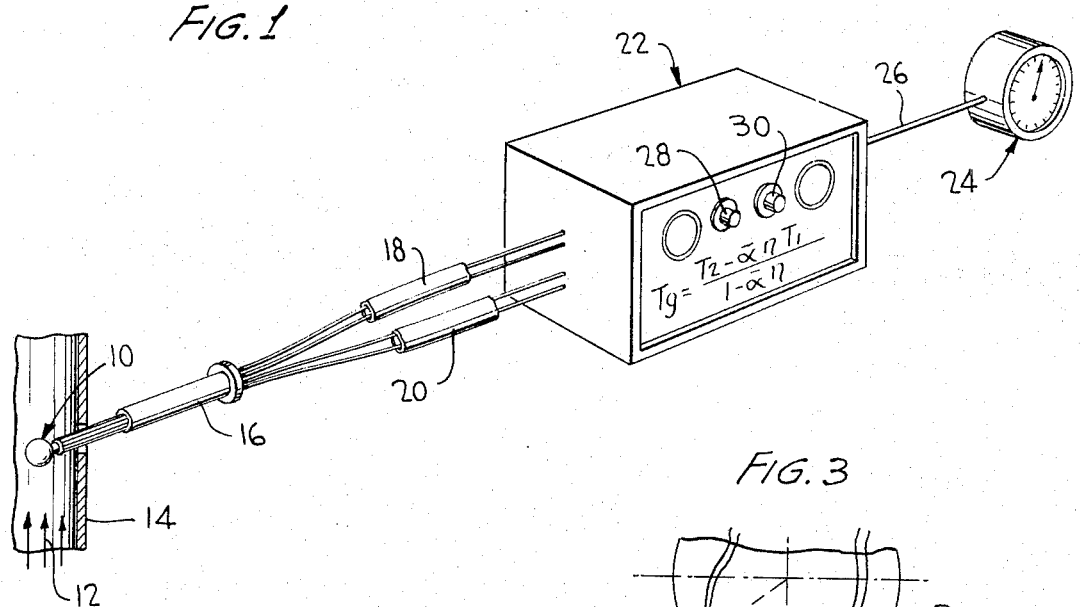

APPARATUS AND METHOD FOR DETERMINING THE TEMPERATURE OF A FLOWING GAS

BACKGROUND OF THE INVENTION

1. Field of the Invention

The present invention pertains to the determination of temperatures of flowing gases and, more particularly, to a method and apparatus for determining such temperatures without requiring a radiation correction.

2. Description of the Prior Art

The measurement of high temperatures in flowing gases is an extremely difficult task in that such measurements normally have an error therein caused by radiation and convection with respect to an exposed probe. That is, a probe exposed to a high temperature flowing gas will attain an equilibrium temperature well below the actual gas temperature, and it is not unusual for the difference in actual gas temperature and probe temperatue to be between 1000° and 2000°F.

This difference is usually determined by equating the convective heat transfer to the probe to the sum of the conductive heat transfer along the probe and the net radiative heat transfer from the probe, and the calculated difference is added to the measured temperature in order to determine the actual gas temperature. The above-mentioned difference calculation requires the use of experimental Nusselt numbers and estimates of the thermal conductivity of the gas and, at best, yields a value of convective heat transfer accurate only to within 20 to 30 percent. Similarly, the emissivity or radiative heat transfer calculations are dependent on surface characteristics such as oxidation, texture, etc.; and attempts are usually made to "blacken" the probe surface. This results in increasing the temperature correction but the emissivity of the probe usually changes during use.

In order to avoid the above-mentioned temperature difference in such measurements, it has been proposed to shield the thermocouple carried in the probe; however, such shielding requires a plurality of shields to be effective. Consequently, it will be appreciated that shielding involves practical fabrication problems as well as difficult material characteristic problems at high temperatures.

Thus, it can be seen that until the present the most feasible manner in which to measure high temperatures in flowing gases was by means of a thermocouple disposed in a probe, which thermocouple provided an electromotive force (EMF) representative of the equilibrium temperature of the probe. As described above, the equilibrium temperature must be corrected in order to determine the actual gas temperature, and such correction is dependent upon the convective heat transfer coefficient and the emissivity of the surface of the probe. The convective heat transfer coefficient is dependent to a great extent upon such gas flow properties as velocity, viscosity, thermal conductivity and specific heat which characteristics are difficult to determine accurately. Thus, experimental convective heat transfer coefficients expressed in terms of a Nusselt number as a function of Reynold's Number and Prandlt Number are utilized in correction calculations and such convection heat transfer coefficients have an accuracy normally no better than 15 to 20 percent. Similarly, the emissivity of the surface changes with time, and the emissivity cannot be determined within 20 to 30 percent. Consequently, the temperature difference between the equilibrium temperature of the probe and the actual gas temperature, which difference is known as the radiation correction, is accurate only to within 40 to 50 percent.

Reference is made to U.S. Pat. Nos. 3,204,447 to Krause et al. and 3,139,752 to Giedt which are exemplary of prior art attempts to measure high temperature flowing gases. U.S. Pat. No. 3,204,447 does not correct for the radiation correction and further has the disadvantage of requiring that gas flow properties at a wall and at a stagnation point be known to predict an enthalpy difference. U.S. Pat. No. 3,139,752 depends for accuracy upon precisely measuring the first derivatives of a time-temperature curve, and this is a difficult operation to perform. Inaccuracies are also involved in that there are substantial uncertainties associated with the first derivative and temperature variations within a sensing element exposed to a high temperature flowing gas.

SUMMARY OF THE INVENTION

Accordingly, it is an object of the present invention to povide a temperature sensing probe for use in determining high temperatures in a flowing gas without requiring radiation correction.

The present invention is generally characterized in a temperature sensing probe for use in measuring the temperature of a flowing gas including a shell exposed to the flowing gas, a first temperature sensor disposed at a first position on a surface of the shell, and a second temperature sensor disposed at a second position on the surface of the shell spaced from the first position whereby the temperature of the flowing gas can be calculated from the temperatures sensed by the first and second temperature sensors independent of convective heat transfer and emissivity of the shell.

Another object of the present invention is to calculate the actual temperature of a flowing gas independent of convective heat transfer and emissivity.

A further object of the present invention is to determine the temperature of a flowing gas by measuring the steady state or equilibrium temperatures at two positions on the surface of a probe.

The present invention has another object in that the surface temperatures at two spaced positions on the surface of a probe are measured by thermocouples.

Another object of the present invention is to provide a method of determining the temperature of a flowing gas by measuring the surface temperature of a probe in two different positions relative to the flow of the gas.

Some of the advantages of the present invention over the prior art are that high temperatures in flowing gases can be determined with great precision, that apparatus for determining such temperatures is relatively simple, that the calculation required to determine such temperatures is not complex, and that no radiation correction is required.

Other objects and advantages of the present invention will become apparent from the following description of the preferred embodiment taken in conjunction with the accompanying drawings.

BRIEF DESCRIPTION OF THE DRAWINGS

FIG. 1 is a perspective of apparatus for determining the temperature of a flowing gas in accordance with the present invention.

FIG. 2 is a broken perspective of the probe utilized with the apparatus of FIG. 1.

FIG. 3 is a side elevation of the probe of FIG. 2.

FIGS. 4 and 5 are broken perspectives of modifications of probes for use with the apparatus of FIG. 1.

DESCRIPTION OF THE PREFERRED EMBODIMENT

Apparatus for determining the temperature in a flowing gas in accordance with the present invention is illustrated in FIG. 1 and includes a probe 10 exposed to a flowing gas indicated by arrows 12 in a conduit or chamber 14. Probe 10 is supported by a suitable hub assembly 16, and two pairs of wires 18 and 20 extend from temperature sensors in probe 10 through hub assembly 16 to computing equipment 22 which is operative to calculate the temperature in the flowing gas 12 from electrical signals received over wires 18 and 20 as will be explained hereinafter. Equipment 22 provides an output to a visual indicating meter 24 through a lead 26 such that the needle of the meter 26 is moved to visually represent the actual temperature of the flowing gas.

Equipment 22 may take the form of an individual piece of hardware having suitable circuitry therein to perform the required calculation and includes adjustment knobs 28 and 30 for setting appropriate constants into the circuitry. It will be appreciated that any suitable means may be utilized to perform the required calculation, such as a properly programmed computer, and that along with meter 24 or in lieu thereof any desired read out means may be utilized such as a printer or Nixie tubes.

As is best illustrated in FIGS. 2 and 3, probe 10 includes a ceramic shell 32 having an outer surface with a spherical configuration exposed to the flowing gas. A thermocouple 34 is disposed on the surface of shell 32 at a position corresponding to the stagnation point of the shell, and a thermocouple 36 is disposed on the surface of shell 32 at a position spaced from thermocouple 34.

The placement of the thermocouples on the surface of the shell is extremely important and the placement of one thermocouple at the stagnation point is preferable to simplify the calculation. The theory upon which the present invention is based will be set forth hereinafter with respect to a spherical probe surface; however, it will be understood that the theory holds for other probe configurations. Furthermore, while the following analysis is based on a laminar boundary layer, the analysis may be extended for turbulent flow.

The local Nusselt number for a sphere at the stagnation point is a constant multiple of the Nusselt number for a different position on the sphere for a laminar boundary layer, and the Nusselt number for the stagnation point on a sphere for laminar boundary layer flow can be written $$Nu_0 = 0.570 \; Pr^{0.4} \; \sqrt{2 \, (D/u_\infty)} \; [du/dx]_0 \; \sqrt{Re_D} \quad (1)$$

where
- $x$ = distance along surface measured from the stagnation point
- $D$ = diameter of the sphere
- $u_\infty$ = gas stream approach velocity
- $u$ = free stream velocity outside boundary layer
- $[du/dx]_0$ = free stream velocity gradient at the stagnation point
- $Pr$ = Prandlt Number
- $Re$ = Reynolds Number If incompressible potential flow outside the boundary layer of the sphere is assumed, the following may be used $$u = Cx = 3 \, (u_\infty/D) \, x \quad (2)$$

so that $$[du/dx]_0 = 3 u_\infty / D \quad (3)$$

and thus equation (1) becomes $$Nu_0 = 0.570 \; Pr^{0.4} \; \sqrt{6 \, Re_D} \quad (4)$$

At a position $\theta$ radians away from the stagnation point, the Nusselt number can be expressed as $$Nu_\theta = 0.763 \; Pr^{0.4} \; \sqrt{Re_x} \quad (5)$$

In this case the surface distance x is related to the diameter of the sphere by $$x = D \, (\theta/2) \quad (6)$$

The equation for $Nu_\theta$ can thus be written $$Nu_\theta = 0.763 \; Pr^{0.4} \; \sqrt{\theta/2} \; \sqrt{Re_D} \quad (7)$$

Dividing equation (7) by equation (4) yields $$(Nu_\theta / Nu_0 = 0.382 \; \sqrt{\theta} \quad (8)$$

This ratio is a constant for a fixed position on the sphere for laminar boundary layer flow; and, consequently, it is significantly implicated that the ratio of the heat transfer coefficients for the two positions on a sphere is independent of Reynolds Number and of gas flow properties so long as they do not change around the sphere.

The radiative flux from a spherically tipped probe with a single thermocouple therein positioned such that the thermocouple is spaced from the stagnation point may be approximated by $$q = \sigma \, \bar{\epsilon} \, F \, [T_1^4 - T_w^4] \quad (9)$$

where
- $\sigma$ = Stephan-Boltzman constant
- $\bar{\epsilon}$ = probe emissivity
- $F$ = shape factor
- $T_1$ = temperature of thermocouple, °R
- $T_w$ = chamber wall temperature, °R This energy is supplied to the probe by convection from the combustion gases; and, thus, a heat balance for the position can be expressed as $$h_1[T_g - T_1] = \sigma \bar{\epsilon} F[T_1^4 - T_w^4] \quad (10)$$

where
$h_1$ = convective heat transfer coefficient
$T_g$ = temperature of gas, °R Similarly, with the probe positioned such that the thermocouple is at the stagnation point, a heat balance can be expressed as $$h_2[T_g - T_2] = \sigma \bar{\epsilon} F[T_2^4 - T_w^4] \quad (11)$$

where
$h_2$ = convective heat transfer coefficient
$T_2$ = temperature of thermocouple at stagnation point, °R assuming that the shape factor is the same as before. If equation (10) is divided by equation (11) and solved for $T_g$ the result is $$T_g = (T_2 - \bar{\alpha} \eta T_1)/(1 - \bar{\alpha} \eta) \quad (12)$$

where
$$\alpha = (T_2^4 - T_w^4)/(T_1^4 - T_w^4) \quad (13)$$

$\eta = (h_1/h_2)$ = a known constant for laminar boundary layer flow

From equation (12), it can be seen that the actual gas temperature can be determined by the surface temperature measurements at two positions on the sphere. The ratio of the convective heat transfer coefficients, $\eta$, may be calculated from $$\frac{Nu_\theta}{Nu_0} = \frac{h_1 x/k}{h_2 d/k} = \frac{h_1 D \frac{\theta}{2}}{h_2 D} = \frac{h_1}{h_2}\left(\frac{\theta}{2}\right)$$

Using equation (8) yields $$(h_1/h_2) = 0.382 \, (2) \, \sqrt{1/\theta} = (0.764/\sqrt{\theta})$$

Assuming that $\theta = \pi/2$, the expression for $T_g$ may be written $$T_g = \frac{T_2 - T_1\left(\frac{0.764}{\sqrt{\theta}}\right)\left(\frac{T_2^4 - T_w^4}{T_1^4 - T_w^4}\right)}{1 - \frac{0.764}{\sqrt{\theta}}\left(\frac{T_2^4 - T_w^4}{T_1^4 - T_w^4}\right)}$$

and it will be appreciated that only the surface temperature measurements and the cold wall temperature, $T_w$, are necessary to yield the actual temperature of the gas. That is, the determination of the actual gas temperature is independent of the convective heat transfer coefficients and the surface emissivity.

From the above it will be appreciated that by placing a pair of thermocouples at spaced positions on the surface of a probe, the temperatures sensed thereby may be utilized to calculate the actual temperature of a flowing gas with great precision and without radiation correction. It will be appreciated that one of the points on the surface of the probe is not required to be the stagnation point and that if the stagnation point is not used, only the value of the constants need be changed. Furthermore, the above heat balance expression could be posed in terms of a convective heat transfer coefficient based on enthalpy difference rather than temperature difference.

The basic equations utilized in the above analysis are well known in the field of heat transfer and can be found in the following treatises:

Sibulkin, M., "Heat Transfer Near the Forward Stagnation Point of a Body of Revolution," *Journal of Aerospace Science*, 19, No. 8, August, 1952, 570–571.

Lees, L., "Laminar Heat Transfer Over Blunt-Nosed Bodies at Hypersonic Flight Speeds," *Jet Propulsion*, 259–269, April, 1956.

Eckert, E. R. G. and Drake, R. M., Jr., *Heat and Mass Transfer*, 2nd Ed., McGraw-Hill Book Co., Inc., New York, 1959.

McAdams, W. H., *Heat Transmission*, McGraw-Hill Book Co, Inc.

Dorrance, W. H., *Viscous Hypersonic Flow*, McGraw-Hill Book Co., Inc., New York, 1962.

Thus, in accordance with the present invention, the actual temperature of a flowing gas may be determined by detecting the electromotive forces generated by thermocouples 34 and 36 which correspond to temperatures $T_2$ and $T_1$, respectively, determining the temperature of chamber wall 14 and setting the value in equipment 22 by means of knob 28, determining the constant $\eta$ which is dependent on the geometrical configuration of the probe and the spacing of the thermocouples and setting the value of $\eta$ in equipment 22 by means of knob 30, and performing the calculation corresponding to equation (12).

The value of $\eta$ can be determined analytically from the geometrical configuration of the probe of the spacing and the thermocouples on the surface thereof or, more practically, can be determined by a calibration procedure; that is, the value of $\eta$ is calculated from the equation $$\eta = [T_g - T_2]/[\bar{\alpha} \, (T_g - T_1)] \quad (14)$$

which equation is derived by solving equation (12) for $\eta$. In order to determine $\eta$, the probe to be utilized is exposed to a flowing gas, the temperature of which is known, and $\bar{\alpha}$ is calculated from equation (13). The temperatures $T_1$ and $T_2$ are determined from thermocouples 36 and 34 respectively and, thus, it may be seen that $\eta$ may be calculated from equation (14). This procedure may be performed as many times as desirable in order to obtain an accurate value for $\eta$ and, thereafter, that value of $\eta$ may be utilized with the calibrated probe with great accuracy.

While the most desirable manner in which to practice the present invention is to utilize a probe having two thermocouples disposed in spaced relation on the surface thereof, a method according to the pesent invention can be practiced with a probe having a single thermocouple therein by taking a first temperature measurement with the probe in a first position and then reorienting the probe to take a second temperature measurement. Of course, the orientation of the probe during such measurements must be precisely controlled in order to permit the accurate determination of the constant $\eta$. After such measurements are obtained, the actual gas temperature is determined in accordance with equation (12).

Modifications of the geometric configuration of the probe are illustrated in FIGS. 4 and 5. In the modification of FIG. 4, a shell 38 of the probe has a triangular configuration with thermocouple 34 disposed at an apex and thermocouple 36 disposed on a side a distance $\gamma$ from thermocouple 34. In the modification of FIG. 5, a shell 40 of the probe has a cylindrical configuration with thermocouples 34 and 36 spaced on the surface thereof by an angle $\theta$.

Any conventional thermocouples may be utilized with the present invention with the requirement that they be accurate at extremely high temperatures. Sensing devices other than thermocouples may also be used with the present invention since the present invention is based on the sensing of temperatures at two spaced positions on the surface of a probe and is not limited to thermocouples for providing such temperature sensing.

It will be appreciated from the above that the apparatus and method of the present invention require only the determination of temperatures at different flow positions on the surface of a probe, the determination of the chamber wall temperature, and the knowledge of the geometric configuration of the probe in order to determine the temperature of a flowing gas with no radiation correction and independent of convective heat transfer and emissivity of the probe surface.

Inasmuch as the present invention is subject to many variations, modifications and changes in detail, it is intended that all matter above described or shown in the drawings be interpreted as illustrative and not in a limiting sense.

What is claimed is:

1. Apparatus for measuring the temperature of a flowing gas in a chamber comprising
    a probe having a spherical shell exposed to the flowing gas;
    first temperature sensing means disposed in said probe to sense a first temperature and provide a first electrical signal in accordance therewith;
    second temperature sensing means disposed in said probe angularly spaced from said first temperature sensing means to sense a second temperature and provide a second electrical signal in accordance therewith; and
    computing means electrically connected with said first and second temperature sensing means to receive said first and second electrical signals, said computing means being operative to compute the temperature of the flowing gas from the equation $$T_g = [T_2 - \alpha\eta\, T_1]/[1 - \alpha\eta]$$

where
  $T_g$ = temperature of the flowing gas
  $T_1$ = temperature sensed by said first temperature sensing means
  $T_2$ = temperature sensed by said second temperature sensing means
  $\alpha = (T_2^4 - T_w^4)/(T_1^4 - T_w^4)$
  $T_w$ = temperature of the wall of the chamber
  $\eta = 0.764/\sqrt{\theta}$
  $\theta$ = the angular spacing of said first and second temperature means.

2. The invention as recited in claim 1 wherein said first and second temperature sensing means are disposed on the surface of said shell.

3. The invention as recited in claim 2 wherein said probe is positioned in said chamber to define a stagnation point on the surface of said shell and said second temperature sensing means is positioned at said stagnation point.

4. The invention as recited in claim 3 wherein said first and second temperature sensing means each include thermo-couple means.

5. A method of determining the temperature of a flowing gas in a chamber comprising the steps of
    measuring the temperature of the wall of the chamber;
    placing a spherical probe carrying a temperature sensor on the surface thereof in a first position in the chamber;
    measuring the temperature sensed by the temperature sensor in the first position;
    angularly displacing the probe to a second position in the chamber;
    measuring the temperature sensed by the temperature sensor in the second position; and
    calculating the temperature of the flowing gas from the equation $$T_g = [T_2 - \bar{\alpha}\eta\, T_1]/[1 - \bar{\alpha}\eta]$$

where
  $T_g$ = temperature of the flowing gas
  $T_1$ = temperature measured by said temperature sensor at said first position
  $T_2$ = temperature measured by said temperature sensor at said second position
  $\alpha = (T_2^4 - T_w^4)/(T_1^4 - T_w^4)$
  $T_w$ = temperature of the wall of the chamber
  $\eta = 0.764/\sqrt{\theta}$
  $\theta$ = the angular displacement between the first and second positions.

6. Apparatus for measuring the temperature of a flowing gas in a chamber comprising
    a probe including a shell exposed to the flowing gas and having a specific configuration to define a stagnation point on the surface of said shell, first temperature sensing means disposed on the surface of said shell to sense a first temperature and provide a first electrical signal in accordance therewith, and second temperature sensing means disposed at said stagnation point on the surface of said shell spaced from said first temperature sensing means to sense a second temperature and provide a second electrical signal in accordance therewith, said first and second temperature sensing means being disposed at different flow positions on said shell asymmetrically with respect to the flowing gas; and
    computing means electrically connected with said first and second temperature sensing means to receive said first and second electrical signals, said computing means being operative to compute the temperature of the flowing gas from the equation $$T_g = [T_2 - \bar{\alpha}\eta T_1]/[1 - \bar{\alpha}\eta]$$

where
  Tg = temperature of the flowing gas
  $T_1$ = temperature sensed by said first temperature sensing means
  $T_2$ = temperature sensed by said second temperature sensing means
  $\bar{\alpha} = (T_2^4 - T_w^4)/(T_1^4 - T_w^4)$
  $T_w$ = temperature of the wall of the chamber
  $\eta$ = a constant dependent on said specific configuration of said shell and the spacing between said first and second temperature sensing means.

7. The invention as recited in claim 6 wherein said first and second temperature sensing means each include thermocouple means.

* * * * *